United States Patent

[11] 3,624,489

[72] Inventor Arnold L. Betton
  Reseda, Calif.
[21] Appl. No. 7,829
[22] Filed Feb. 2, 1970
[45] Patented Nov. 30, 1971
[73] Assignee Litton Systems, Inc.
  Beverly Hills, Calif.

[54] CONSTANT CURRENT VARIABLE LOAD REGULATOR
  10 Claims, 1 Drawing Fig.
[52] U.S. Cl. .................................................. 323/4,
  307/33, 307/35, 323/9, 323/25, 323/31, 324/57
[51] Int. Cl. .................................................. G05f 1/58
[50] Field of Search .......................................... 323/4, 7, 8,
  9, 22 T, 23, 25, 31, 20; 324/57; 307/31, 32, 33, 35

[56] References Cited
  UNITED STATES PATENTS

| | | | |
|---|---|---|---|
| 3,196,343 | 7/1965 | Griffin | 323/22 T |
| 3,417,319 | 12/1968 | Shaughnessy | 323/4 |
| 3,440,518 | 4/1969 | Cliffgard et al. | 323/4 |
| 3,431,429 | 3/1969 | Phillips | 323/20 X |
| 3,536,989 | 10/1970 | Muchnick | 323/20 |

Primary Examiner—Gerald Goldberg
Attorneys—Alan C. Rose, Alfred B. Levine, Ronald W. Reagin, John G. Mesaros, Lawrence V. Link, Jr. and Thomas A. Seeman ABSTRACT: A variable electronic load simulator for testing power supplies having a variable resistance for maintaining a predetermined level of load current. The load current is monitored by means of a voltage drop across the resistor in series with the variable resistance circuit. This voltage drop is compared to a fixed reference voltage in a differential control amplifier which controls the variable resistance circuit to maintain the load current at the predetermined level.

PATENTED NOV 30 1971
3,624,489
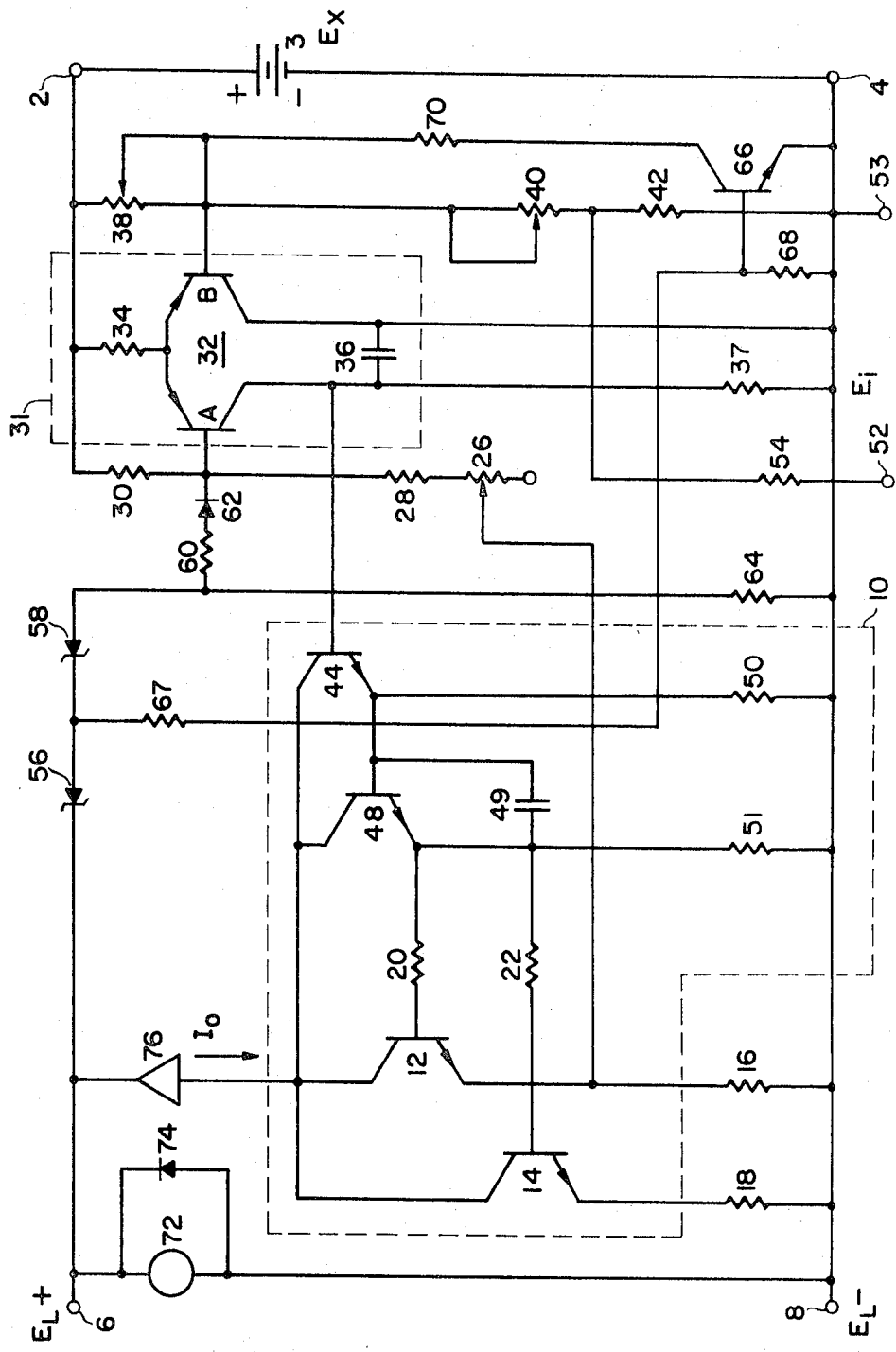
INVENTOR.
ARNOLD L. BETTON
BY John G. Mesaros
ATTORNEY

CONSTANT CURRENT VARIABLE LOAD REGULATOR

BACKGROUND OF THE INVENTION

This invention pertains to the art of simulating loads for power supplies. In the prior art, decade resistor boxes have been used to dissipate power from electrical power supplies under test. A decade resistor box comprises a number of resistors arranged so that any value of resistance between a minimum and maximum may be selected by connecting or switching the appropriate resistors in series. In using a decade resistance box to obtain a desired level of current through a power supply it is necessary to calculate the appropriate value of resistance. In performing the calculation the output voltage of the power supply is divided by the desired level of current to obtain the desired value of resistance. The appropriate resistors in the decade box are then connected or switched in series and the combination is connected to the power supply to draw the desired current level. The use of decade resistance boxes to test power supplies is subject to several other disadvantages. It is not possible to continuously vary the load current because the resistance of the decade box varies in discrete increments. Also, it may be inconvenient to vary the load current from one level to another because it is necessary to make a calculation and then change the connections of the decade resistance box for each different current level desired. Further, it is not possible to subject a power supply to a dynamic test by using a decade resistance box because a load resistance of a fixed value will result in a steady current level. In addition, when using a decade resistance box it is not possible to isolate the load current from changes in the output voltage from the power supply under test. Since the resistance of the decade box is fixed at a particular value, if the input voltage to the box increases or decreases, the load current must vary correspondingly. In addition, the decade resistance box can be damaged by subjecting it to a level of load current beyond its capability to dissipate the power.

SUMMARY OF THE INVENTION

The novel power supply load of the invention comprises a variable impedance for maintaining a predetermined level of load current which is connected in series with a sensing resistor for developing a signal indicative of the level of the load current. A difference amplifier receives the signal from the sensing resistor and varies the impedance of the variable impedance to maintain the load current at the predetermined level. An internal power supply or battery supplies electrical power to the difference amplifier. The capability to absorb power from the power supply may be increased by connecting additional variable impedances in parallel. The load current may be continuously adjusted from zero to a predetermined maximum by varying a variable resistor. A power supply may be subjected to a dynamic test by applying an AC signal to an input to the difference amplifier. The load current will then be varied about the predetermined level proportionately to the AC signal. The level of load current through the variable resistance is relatively unaffected by changes in the output voltage from a power supply under test. If the voltage from a power supply changes, this change will be reflected by a change of voltage drop across the sensing resistor. The difference amplifier will respond to the change by varying the impedance of the variable impedance circuit to maintain the load current at the predetermined level. Overload protection for the variable impedances provided by a circuit which reduces the range of load current which will be permitted by the control device. In the event of an excessive output voltage the load current is switched to a fraction of the predetermined value. If the output voltage continues to rise a second protection circuit operates at a predetermined level of output voltage to switch the variable electronic load out of operation.

It is an object of the invention to provide an electronic load for power supplies which permits the selection of any load current up to a predetermined maximum.

Another object of the invention is to provide an electronic load for power supplies which will maintain a predetermined load current relatively unaffected by changes in the output voltage from a power supply under test.

Yet another object of the invention is to provide a variable load for power supplies which can be utilized to dynamically test power supplies.

Still another object of the invention is to provide a variable electronic load which is protected from damage in the event an excessively high voltage is applied to it.

With reference now to the drawing, there is a schematic diagram of the continuously variable programmable load of the present invention.

Input terminal 2 is connected to a power supply for energizing the control circuitry of the load. For example, a battery 3 may be used as the source of power with the positive terminal being connected to input terminal 2 and the negative terminal being connected to input terminal 4. Of course, another source of power other than a battery, such as a rectifier and series regulator, may be connected to terminals 2 and 4.

A load is connected to a power supply under test at terminals 6 and 8 (not shown). The output voltage from a power supply, $E_1$, is connected so that a positive voltage appears at terminal 6 with respect to the voltage at terminal 8.

The resistance to the load current, $I_o$, is controlled by varying the resistance of variable resistance circuit 10 to maintain the load current at a predetermined level. The load current is divided between the parallel paths each comprising a transistor in series with a resistor. A current path exists from terminal 6 through transistors 12 and 14. Transistors 12 and 14 are operated in a linear mode so that current flow through the transistors is proportional to an input current applied to the base of the transistors. Transistors 12 and 14 absorb the power being supplied by the power supply under test (not shown) connected to terminals 6 and 8. Resistor 16 is connected between the emitter of transistor 12 and terminal 8. Resistor 18 is connected between the emitter of transistor 14 and terminal 8. The transistors should be mounted on a heat sink. Additional networks may be connected between terminals 6 and 8 in the manner that transistor 12 and resistor 16 are connected. Each additional network may comprise a transistor and a resistor connected in the manner of transistor 12 and resistor 16 and a resistor connected in the manner of base current equalization resistor 20. Such additional circuits may be utilized if it is desired to increase the capability of the load to absorb power or to operate at a higher level of load current, $I_o$.

The load current, $I_o$, is monitored by measuring the voltage developed across resistor 16. The value of resistor 16 is selected so that a voltage drop of not less than a few hundredths of a volt will be developed across resistor 16 when the load current through it is near zero. Resistors 16 and 18 have approximately the same resistance and therefore, have approximately the same magnitude of current flowing through them. The base-emitter voltage drop in power transistors varies slightly from one transistor to another. Accordingly, the value of resistors 18 may be selected to compensate for slightly different base-emitter voltage drops in transistors 12 and 14 so that the current in the parallel networks is very nearly equal.

Resistors 20 and 22 are drive resistors for stabilizing the Beta response of transistors 12 and 14 respectively. Transistors of the type utilized in variable resistance circuit 10 have a high Beta which may vary somewhat from one transistor to another. If one power transistor does have higher Beta than the other, the omission of a drive resistor would result in a higher current through the transistor having the higher Beta. Resistors 20 and 22 are used to equalize the base current in each transistor thereby dividing the load current evenly between the two transistors.

A predetermined level of the load current, $I_o$, is established by adjusting a bias network comprising resistors 26, 28 and 30 which are connected in series between the emitter of transistor 12 and terminal 2. Adjusting resistor 26 controls the operation of differential amplifier circuit 31 which in turn sets the predetermined level of load current, $I_o$, through variable resistance 10.

Difference amplifier circuit 31 comprises difference amplifier 32A and 32B, resistors 34 and capacitor 36. Resistor 34 is connected between the common emitters of difference amplifier 32A and 32B and terminal 2. Capacitor 36 is connected between the collectors of difference amplifier 32A and 32B to prevent oscillation and other high frequency responses in difference amplifier 32. The collector of difference amplifier 32A is connected to the junction of capacitor 36 and resistor 37 which is in turn connected to terminal 4. The collector of difference amplifier 32B is connected to terminal 4.

A resistor network comprising resistors 38, 40 and 42 is connected in series between terminals 2 and 4. This network produces a bias voltage at the base input of difference amplifier 32B. The maximum permitted load current is set by adjusting variable resistor 38 and variable resistor 40. Varying resistor 26 from the maximum resistors produces a corresponding change in the load current from zero to the maximum permitted level.

A varying output voltage at the collector of difference amplifier 32A is used to maintain the level of the load current, $I_o$, through transistors 12 and 14 at the predetermined level of load current flow set by the adjustment of resistor 26. The signal from the collector of difference amplifier 32A is coupled to the base input of both transistors 12 and 14 through a pair of emitter-follower stages comprising transistors 44 and 48. The collector of difference amplifier 32A is directly connected to the base input of transistor 44. The emitter of transistor 44 is connected to the base of transistor 48. The voltage at the emitter of each emitter-follower follows the input signal to its base. Resistor 37 is a turnoff resistor connected between the base of transistor 44 and terminal 4 which functions to decrease the storage time required when transistor 44 is gated out of conduction. Similarly, the signal appearing at the emitter of transistor 44 is directly coupled to the base input of transistor 48. Capacitor 49 is connected between the base and the emitter of transistor 48 as a rolloff capacitor to prevent oscillation. Resistor 50 is a turnoff resistor connected between the base of transistor 48 and terminal 4. Its function is similar to that of resistor 37. In the preferred embodiment the emitter-follower stages comprising transistors 44 and 48 provide a current gain of approximately five thousand. The emitter of transistor 48 is coupled to the base inputs of transistors 12 and 14 through resistors 20 and 22 respectively. The drive current coupled to the base input of transistors 12 and 14 controls the amount of current flowing through these transistors. Recall that current through transistors 12 and 14 is supplied by the power supply system under test (not shown) which is connected to terminals 6 and 8. Resistor 51 is a turnoff resistor connected between the emitter of transistor 48 and terminal 4. Its function is to reduce the storage time in transistors 12 and 14.

The level of the load current through the transistors 12 and 14 may be externally varied about the predetermined level of load current set by the adjustment of resistors 26. An input signal to dynamically program the load may be applied at terminals 52 and 53. A signal applied at terminal 52 is coupled to difference amplifier 32B by resistor 54 which is connected between terminal 52 and the junction of resistors 40 and 42. Terminal 53 is connected to terminals 4 and 8. Recall that the bias voltage for difference amplifier 32 is set by the voltage divider network comprising resistors 38, 40 and 42. An external input signal, $E_i$, which may be an AC signal, is developed across the voltage divider network comprising resistors 54 and 42. Resistor 42 is made small with respect to resistor 40 to scale down the external voltage, $E_i$, to a level compatible with difference amplifier 32B. A ratio of resistor 54 and resistor 42 is selected to give a specific scale factor for changes in the load current as a function of the programmable input voltage, $E_i$. The voltage drop across resistor 42 due to the programmable input voltage, $E_i$, is used to modify the bias input voltage to difference amplifier 32B. The upper frequency limit of the programmable input voltage is established by the bandwidth of the control loop.

A network comprising Zener diode 56, transistor 66, resistor 67, resistor 68 and resistor 70 automatically protects transistors 12 and 14 from excessive current by scaling down the load current. Zener diode 56, resistor 67 and resistor 68 are connected in series between terminals 6 and 8. The base junction of transistor 66 is connected between the junction of transistors 67 and 68. The emitter of transistor 66 is connected to terminals 4 and 8. The collector of transistor 66 is connected to resistor 70 which in turn is connected to the base input junction of difference amplifier 32B. If the applied voltage exceeds a predetermined value set by the characteristic of Zener diode 56, transistor 66 is gated out of conduction by the current flowing through resistors 66 and 67. Conduction through transistor 66 changes the bias voltage at the base input of difference amplifier 32B. In other words, conduction through transistor 66 compresses the range of possible load current levels in the same manner as would the adjustment of resistor 38 by a predetermined change.

Another network comprising Zener diode 56, Zener diode 58, resistor 60, diode 62 and resistor 64 reduces the load current, $I_o$, to zero when the voltage applied to terminals 6 and 8 by a power supply system (not shown) exceeds the capability of transistors 12 and 14 to dissipate the power. Zener diode 56, Zener diode 58 and resistor 64 are connected in series between terminals 6 and 8. Resistor 60 and diode 62 are connected in series between the junction of Zener diode 58 and resistor 64 and the base input connection of difference amplifier 32A. If the voltage at terminal 8 rises to a value sufficiently high to cause both Zener diodes 56 and 58 to conduct, difference amplifier 32A will gate out of conduction which in turn reduces the load current, $I_o$, to zero.

The applied voltage, $E_i$, may be conveniently monitored by voltmeter 72. Voltmeter 72 is connected between terminals 6 and 8. Diode 74 is connected in parallel with voltmeter 72 to protect it in the event a voltage of the wrong polarity is applied to terminals 6 and 8.

Similarly, the load current, $I_o$, may be monitored by ammeter 76 if it is desired to have a visual indication of the load current. Ammeter 76 is connected in series between terminal 6 and the collector of transistor 12.

Turning now to the theory of operation of the continuously variable load simulator of the invention, if it is assumed that a negligible loading of resistor 16 exists due to current flow from battery 3, the general equation relating to the load current, $I_o$, the reference voltage, $E_r$, and the values of the various resistors in the voltage divider networks are:

$$I_o = \frac{E_x}{R_{16}} \left[ 1 - \frac{R_{38}(R_{30} + R_{28} + R_{26})}{R_{30}(R_{38} + R_{40} + R_{42})} \right]$$

The maximum load current, $I_o(\max)$, is set by adjusting resistor 38. Resistor 38 is adjusted only when resistor 26 is adjusted to its zero resistance (maximum $I_o$) position. The value resistor 38 is determined by the following equation.

$$R_{38} = \left[\frac{1-a}{1+a}\right] R_{40} \text{ where: } \begin{matrix} R_{30} = R_{28} \\ R_{42} << R_{40} \\ a = I_o(\max.) \frac{R_{16}}{E_{ref}} \end{matrix}$$

Subsequently, the load current may be varied between zero and the maximum, $I_o(\max)$, by varying resistor 26. Resistor 26 controls the magnitude of the load current, $I_o$, in accordance with the following equation:

$$I_o = I_o(\max.) - KR_{26} \text{ where: } K = \frac{\frac{E_x}{R_{16}} - I_o(\max.)}{2R_{30}}$$

From the above equation it may be seen that the load current, $I_o$, may be smoothly adjusted from $I_o(\max)$ to zero in direction proportion to the resistance value of resistor 26.

Consider now the operation of the variable electronic load of the invention. The maximum level of the load current is set by the adjustment of variable resistors 38 and 40 which set the bias level for difference amplifier 32B. Adjusting resistor 26 controls the flow of current through differential amplifier circuit 31 which in turn varies the load current through transistors 12 and 14 from zero to the predetermined maximum level set by the adjustment of resistors 38 and 40.

The maximum load current is set in the following manner. Assume for the moment that variable resistor 26 is adjusted to a position of minimum resistance so that a maximum load current will flow through transistors 12 and 14. The maximum level will be determined by the adjustment of resistors 38 and 40. The load current may be controlled by controlling the flow of current through each side of the difference amplifier 32. Adjusting resistor 38 or 40 to a position of maximum resistance establishes the bias voltage at the input to difference amplifier 32B at its least positive position. For example, varying resistor 38 from a position of maximum resistance to a position of minimum resistance varies the input voltage to the base of difference amplifier 32B in a positive-going direction. This positive-going input voltage causes more current to flow through difference amplifier 32B and less through difference amplifier 32A. In response to this change in current flow the collector of difference amplifier 32B varies in a negative-going direction and the voltage at the collector of difference amplifier 32B varies in a more positive-going direction. The positive-going voltage at the collector of difference amplifier 32A is applied to transistors 12 and 14 through emitter followers 44 and 48 to set the predetermined maximum load current. The numerical value of the load current, $I_o$, may be calculated as a function of the value of resistor 38 from the equation set forth above.

The level of the current load, $I_o$, through transistors 12 and 14 may be varied from zero to the maximum level set by resistors 38 and 40 by varying resistor 26. A fixed voltage, $E_x$, appears across the voltage divider network comprises resistors 16, 26, 28 and 30. With resistor 26 set to a position of minimum resistance, the level of current flow would be at a maximum as described above. Assume, however, that variable resistor 26 is set to a position maximum resistance before a power supply is connected to terminals 6 and 8 for testing. At this setting difference amplifier 32A will cut off conduction through transistors 12 and 14. The voltage drop across resistor 16 due to the voltage, $E_x$, will be only a fraction of a volt because of the small resistance of the sensing resistor. As resistor 26 is varied from a position of maximum resistance to minimum resistance, the input voltage at the base of difference amplifier 32A varies in a negative-going direction. Difference amplifier 32 compares the bias voltage at the base of amplifier 32B with the voltage at the base of amplifier 32A. Current through difference amplifier 32A is proportional to the difference between the voltages at the base of difference amplifier 32. This varying input voltage causes more current to flow through difference amplifier 32A and less through difference amplifier 32B. As variable resistor 26 is varied toward a position of zero resistance, the voltage at the collector of difference amplifier 32A varies in a positive-going direction. The signal at the collector of difference amplifier 32A is coupled to transistors 12 and 14 through emitter-followers 44 and 48. A positive-going signal at the collector of difference amplifier 32A results in a positive-going signal at the base of transistors 12 and 14 which drives these transistors into an increased level of conduction. The total load current is divided between the number of transistors connected in parallel. Increased conduction through transistor 12 also increases the level of current flow through series resistor 16. To describe the operation of the control loop in another way, when the resistance of resistor 26 is varied toward minimum resistance, less the references voltage $E_x$, appears across resistor 26 and more across resistor 16. Difference amplifier 32A responds to the change in input voltage by varying the resistance to current flow offered by transistors 12 and 14. The current flow through resistor 16 is thereby increased to a level corresponding to the increased voltage drop across resistor 16.

A level of current, $I_o$, established by adjusting resistor 26, is relatively unaffected by a change in the voltage, $E_1$, applied to terminals 6 and 8. For example, an increase in the voltage by the terminal 6 will result in a momentary increase in current through transistors 12 and 14. As a result the voltage drop across resistor 16 will be momentarily increased. This, in turn, will cause a slight change in the bias voltage at the input of difference amplifier 32A in a positive-going direction. The voltage at the collector of difference amplifier 32A will then change slightly in a negative-going direction. This change will be coupled to the base input junctions of transistors 12 and 14 through emitter-followers 44 and 48. The negative-going voltages at the base inputs of transistors 12 and 14 will cause a decrease in conduction through these transistors. Thus, the current level through transistors 12 and 14 will remain relatively stable.

The level of load current through transistors 12 and 14 may be externally programmed by applying an input signal to terminals 52 and 53. A signal applied to terminals 52 and 53 will vary the load current about the predetermined level set by resistor 26. The voltage drop across resistor 42, which is a function of the programmable input voltage, $E_x'$ is used to modify the bias input voltage to the base of difference amplifier 32B. Direct coupling to the base of difference amplifier 32B permits static changes as a result of DC voltages applied to terminals 52 and 53 as well as dynamic changes in the load current in response to sinusoidal or other variable waveforms. A positive voltage applied to terminal 52 causes the bias voltage at the base of difference amplifier 32B to vary in a positive-going direction. The collector voltage of difference amplifier 32B changes in a negative-going direction in response to the positive input signal. The voltage at the collector of difference amplifier 32A varies in a positive-going direction because more current flows through difference amplifier 32B and less through difference amplifier 32A. The positive-going voltage at the collector of difference amplifier 32A is applied to transistors 12 and 14 through emitter-followers 44 and 48 to increase the load current. Conversely, negative-going voltage applied to terminal 52 will cause the load current to decrease. Interestingly, the variable electronic load of the invention may also be used as an audio amplifier by connecting a speaker in series between a power supply and terminal 6 or 8, adjusting resistor 26 to deflect the cone of the speaker from its rest position and applying an audio signal to terminal 53. The speaker cone will then be deflected about the static position at audio frequencies.

Transistors 12 and 14 are protected from an overcurrent condition in the event an excessively high voltage is applied to terminals 6 and 8. When the applied voltage, $E_1$, exceeds the predetermined value set by the Zener voltage drop of Zener diode 56, transistor 66 is gated into conduction by current flowing through resistors 67 and 68. Conduction through transistor 66 clamps its collector to the potential of terminal 4 or ground. The effective grounding of resistor 70 changes the scale factor of the divider network which provides a bias voltage to difference amplifier 32B. The voltage applied to the base of difference amplifier 32B results in a lower value for the predetermined maximum current level. In other words, conduction through transistor 66 produces the same effect as would readjusting resistor 38 to set a lower maximum level of the load current. Thus, the load current is maintained within the capability of transistors 12 and 14 to dissipate the power.

If the applied voltage, $E_1$, continues to rise to a value sufficient to cause conduction through Zener diode 58, the load current through transistors 12 and 14 is switched completely off. Before the load current is completely switched off, the scale factor of the load current will be automatically adjusted by transistor 66 in the manner described above. When Zener diode 58 conducts, the voltage at the junction of resistors 60 and 64 becomes more positive. Diode 62 applies this positive potential to the base of difference amplifier 32A. Difference amplifier 32A is biased out of conduction which results in a negative-going signal at its collector. This negative-going signal is coupled by emitter-followers 44 and 88 to the bases of transistors 12 and 14 thereby gating them out of conduction.

I claim:

1. A continuously variable electric load for maintaining a constant current drain from a power supply, said load comprising:
    a pair of input terminals adapted to be connected to a power supply;
    a variable impedance connected between said terminals for maintaining a predetermined level of load current;
    means for sensing current connected to said variable impedance for sensing the level of current flowing through said variable impedance means and for developing a signal indicative of said level of the load current;
    control means connected to said means for sensing current to receive said signal, and connected to said variable impedance, said control means being responsive to said signal to regulate the impedance of said variable impedance to maintain a predetermined load current level; and
    means for supplying electrical power to said control means.

2. The combination according to claim 1 and further comprising a second variable impedance and a resistor connected in series between said input terminals to divide the load current between said variable impedances, said control means being connected to both said variable impedances.

3. The combination according to claim 1 further comprising a plurality of circuits connected between said input terminals to divide the load current, each said circuit comprising a variable impedance and a resistor connected in series, said control means being connected to each said variable impedance to regulate a predetermined current level through each said variable impedance.

4. The combination according to claim 1 wherein said control means includes an input network for receiving an AC signal, said variable impedance being responsive to said control means to vary the load current in accordance with the AC signal.

5. The combination according to claim 1 wherein said control means includes a difference amplifier.

6. The combination according to claim 5 and further comprising a Zener diode and a voltage divider network connected in series between said input terminals and a bistable device connected between said voltage divider network and said difference amplifier for switching to a first stable state whenever the input voltage falls below a predetermined level and for switching to a second stable state whenever the input voltage rises above the predetermined level, said difference amplifier being responsive to said bistable device to reduce the load current by a predetermined scale factor whenever the input voltage rises above the predetermined voltage level.

7. The combination according to claim 6 and further comprising a Zener diode and a resistor connected in series between the junction of said first-mentioned Zener diode and said voltage divider network and said input terminal, and further including a second resistor connected to the junction of said second Zener diode and said first resistor and said difference amplifier, said difference amplifier being responsive to the input voltage to switch the load current to substantially zero when said input voltage rises above a predetermined voltage level.

8. The combination according to claim 1 wherein said variable impedance is a transistor and said means for sensing current includes a resistor connected in series with said transistor between said input terminals.

9. A continuously variable electrical load comprising:
    a pair of input terminals;
    at least one transistor connected to a first one of said terminals for maintaining predetermined level of load current;
    a current-sensing resistor connected in series between said transistor and a second one of said input terminals for developing a signal indicative of the load current level;
    means for supplying electrical power;
    a difference amplifier having a pair of inputs connected to said means for supplying electrical power, said difference amplifier including a pair of bias networks, a first bias network connected in series between said means for supplying electrical power and said sensing resistor, said first biasing network including at least one variable resistor for adjusting the load current to a predetermined level, a first input of said pair of inputs to said difference amplifier connected to said first bias network to receive a signal indicative of the difference between the actual load current and the predetermined level of load current, said second bias network connected to said power supply to establish a reference voltage, said second bias network having at least one variable resistor for setting a predetermined maximum level of load current, a second one of said pair of inputs of said difference amplifier connected to said second bias network to receive a reference voltage corresponding to the predetermined maximum level of load current; and
    means for coupling the output signal from said difference amplifier to said transistor for maintaining the load current level through said transistor at the predetermined level.

10. The combination according to claim 9 comprising:
    a plurality of transistors connected to a first one of said terminals for maintaining a predetermined level of load current, each of said transistors having a current-sensing resistor connected in series with a second one of said input terminals, at least one of said current-sensing resistors developing a signal indicative of the load current level, said coupling means coupling the output signal from said difference amplifier to each of said transistors for maintaining the load current level through each said transistor at the predetermined level.

* * * * *

PO-1050
(5/69)

UNITED STATES PATENT OFFICE
CERTIFICATE OF CORRECTION

Patent No. 3,624,489           Dated November 30, 1971

Inventor(s)         Arnold L. Betton

It is certified that error appears in the above-identified patent and that said Letters Patent are hereby corrected as shown below:

Column 1, line 66, "impedances" should read --impendance is--;

Column 3, line 6, "resistors" should read --resistor--;

Column 6, line 6, after momentary" and before "increase"
   read --small--;

Claim 2, column 7, line 24, delete --and--.

Signed and sealed this 2nd day of May 1972.

(SEAL)
Attest:

EDWARD M. FLETCHER, JR.
Attesting Officer

ROBERT GOTTSCHALK
Commissioner of Patents